E. G. LEDYARD.
REVOLVING DUMP CART.
APPLICATION FILED AUG. 19, 1913.

1,117,865.

Patented Nov. 17, 1914.
3 SHEETS—SHEET 1.

WITNESSES

INVENTOR
Elisha G. Ledyard
BY
ATTORNEYS

E. G. LEDYARD.
REVOLVING DUMP CART.
APPLICATION FILED AUG. 19, 1913.

1,117,865.

Patented Nov. 17, 1914.

3 SHEETS—SHEET 2.

WITNESSES

INVENTOR
Elisha G. Ledyard
BY
ATTORNEYS

E. G. LEDYARD.
REVOLVING DUMP CART.
APPLICATION FILED AUG. 19, 1913.
1,117,865.
Patented Nov. 17, 1914.
3 SHEETS—SHEET 3.
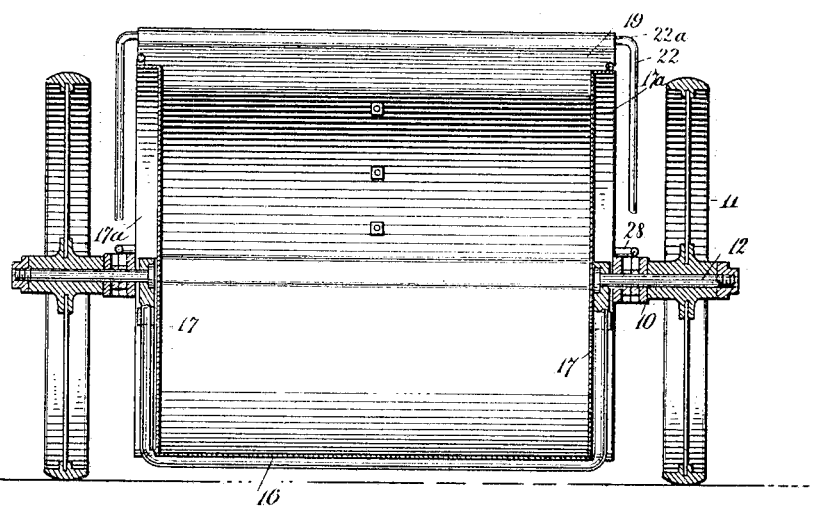
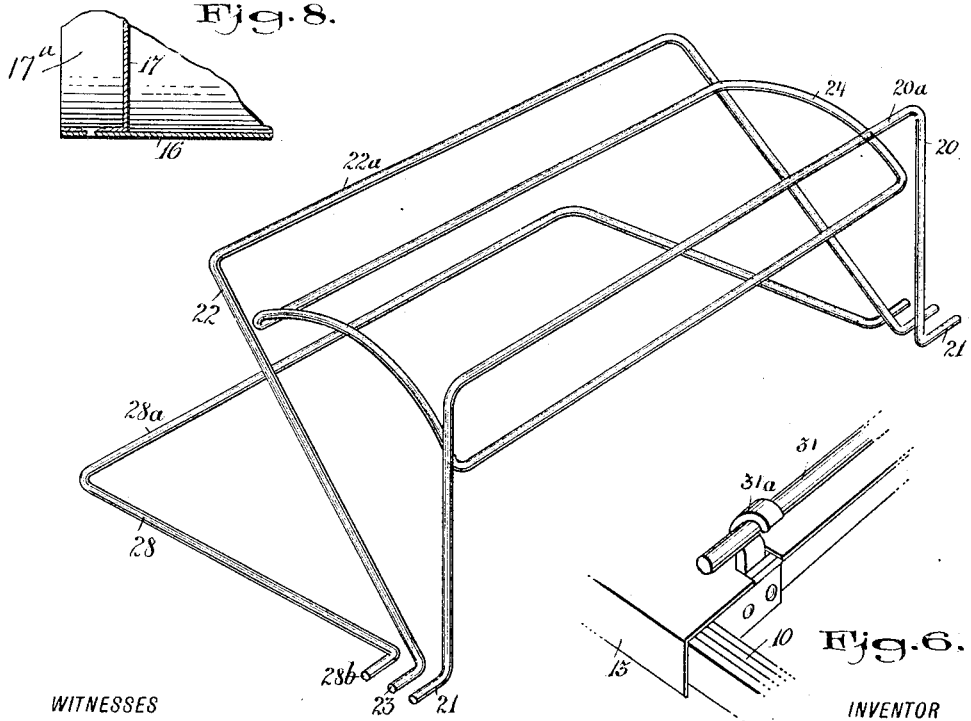
INVENTOR
Elisha G. Ledyard

UNITED STATES PATENT OFFICE.

ELISHA G. LEDYARD, OF SIOUX FALLS, SOUTH DAKOTA.

REVOLVING DUMP-CART.

1,117,865. Specification of Letters Patent. Patented Nov. 17, 1914.

Application filed August 19, 1913. Serial No. 785,558.

*To all whom it may concern:*

Be it known that I, ELISHA G. LEDYARD, a citizen of the United States, and a resident of Sioux Falls, in the county of Minnehaha and State of South Dakota, have invented a new and Improved Revolving Dump-Cart, of which the following is a full, clear, and exact description.

It is a design of my invention to provide a dump cart especially adapted for use in grading, road-work and the like, and in which the body or pan is mounted to revolve on a horizontal axis for dumping the load.

It is a further design of the invention to provide, in connection with the revolving body or pan, a cover so arranged as to prevent the rotary movement of the pan, and to be moved relatively to the pan when the latter is to be dumped.

It is also a design of my invention to so construct and arrange the pan and cover that the pan, in one position, may be employed as a scraper or leveler, to level off the dumped material.

Further objects of the invention will appear from the specific description following.

Reference is to be had to the accompanying drawings forming a part of this specification, in which similar characters of reference indicate corresponding parts in all the views.

Figure 1:
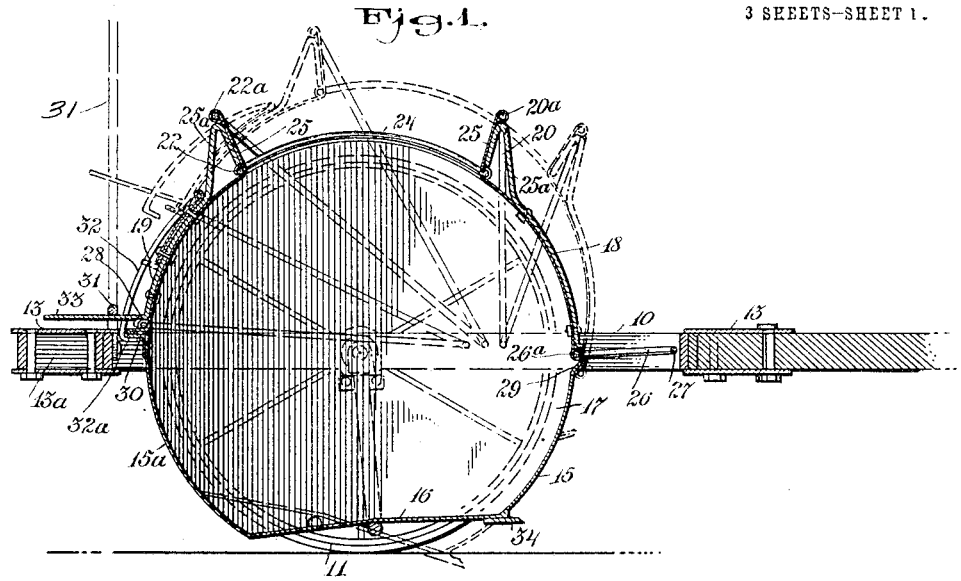
Figure 2:
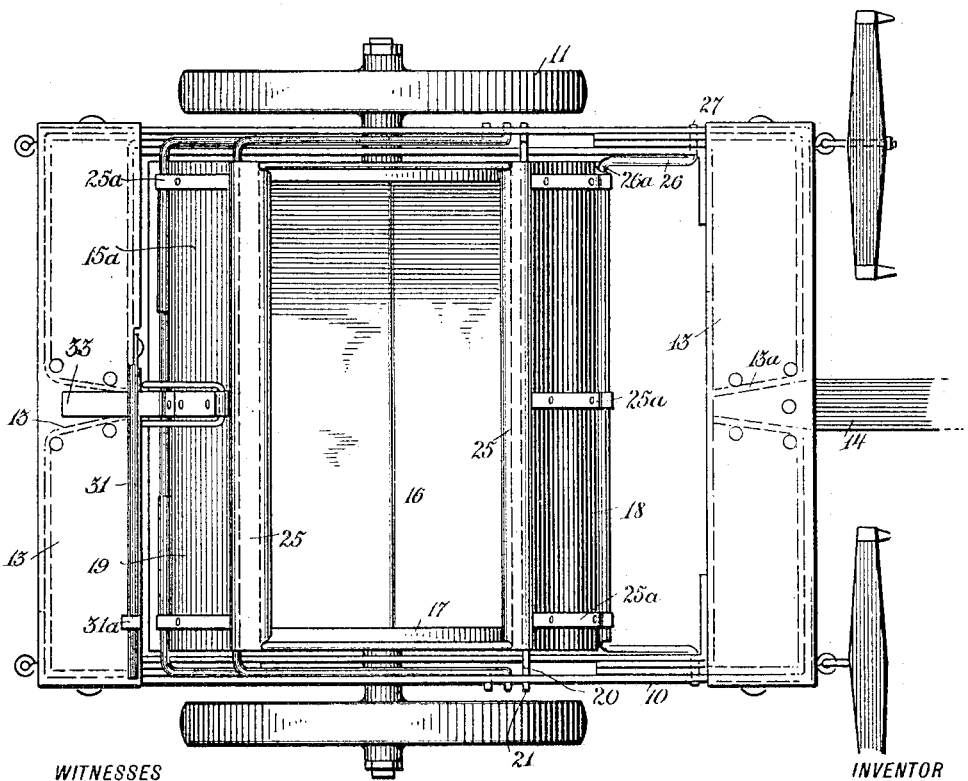
Figure 3:
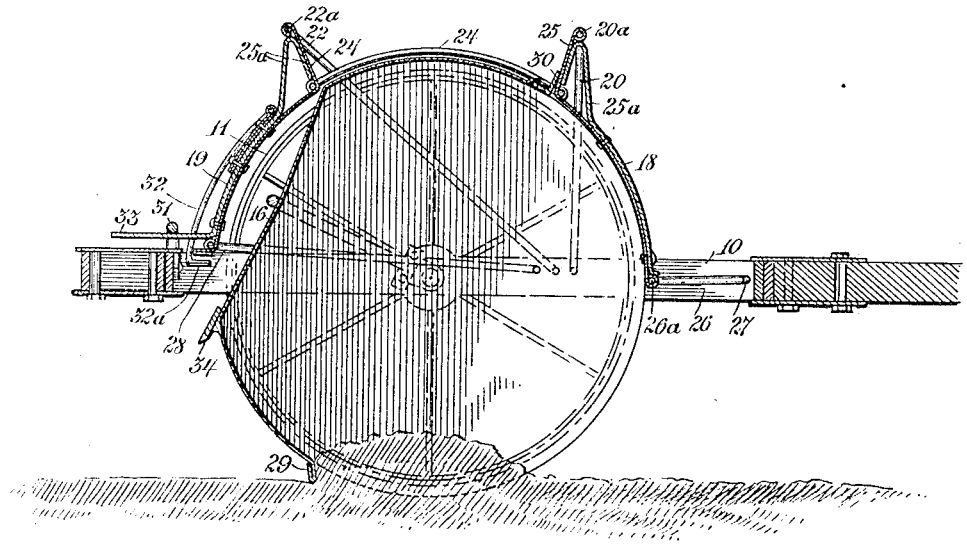
Figure 4:
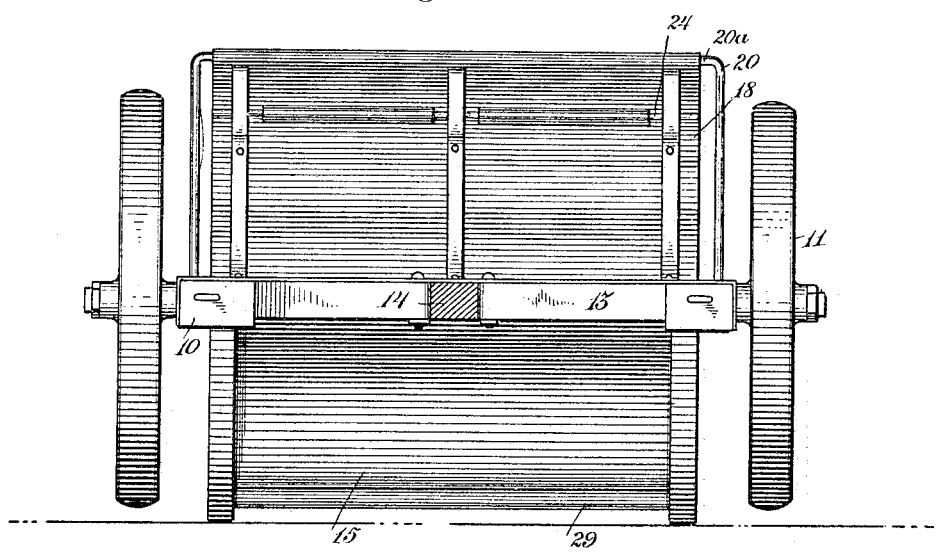

Figure 1 is a longitudinal vertical section; Fig. 2 is a plan view of a revolving dump cart embodying my invention; Fig. 3 is a side elevation showing the cart in the position for dumping; Fig. 4 is a front elevation, the tongue being in section; Fig. 5 is a transverse vertical section; Fig. 6 is a fragmentary perspective showing a detail of the latch device for the cover; Fig. 7 is a perspective view of the means for supporting the cover sections, and Fig. 8 is a detail longitudinal section showing the manner of fastening the ends of the body.

In constructing a cart in accordance with the illustrated example, a frame 10 is provided, having running wheels 11 turning on stud axles 12 (Fig. 5). The frame is made the same at both ends so as to be reversible, there being cross-bars 13 made up of suitable transverse elements and having tongue sockets 13$^a$ to receive a removable draft tongue 14, adapted to be inserted in either socket 13$^a$.

On the inner ends of the stud axles 12 is secured the pan or body of the cart, the pan being generally of cylindrical form having a rounded front 15, a rounded rear side 15$^a$, and a bottom 16 flattened or otherwise depressed to present a lateral surface within the lateral surface of the running wheels, so that the bottom will normally be above the ground surface. A U-shaped hanger or frame member 16 may be employed to extend beneath the pan and strengthen the same. Ends 17, substantially round except at the depressed bottom portion, are provided, and the front and back 15, 15$^a$, of the pan extend about half the height of the ends, thus leaving the pan open above the horizontal center, the round ends 17 rising above the front and back. The ends are set within the side edges of the body and are formed with lateral flanges 17$^a$ (Figs. 5 and 8) riveted or otherwise suitably fastened to the front 15 and back 15$^a$. The flanges extend annularly and form tread surfaces at the open top, when the body or pan rolls on the ground as hereinafter further referred to. In connection with a pan of this form a movable cover is provided, preferably a lifting cover, and formed of a front section 18 and a rear section 19, said sections being curved, to correspond substantially with the curvature of the front and back, 15, 15$^a$, of the pan. The section 18 is sustained by side arms 20 pivoted by their outwardly bent ends 21 on the frame 10, the said arms being in the present instance joined by a crossbar 20$^a$ around which an edge of the sheet metal cover section is bent, to suspend said cover-section. Similarly the rear cover section 19 is supported on arms 22, the outwardly bent lower ends 23 of which are pivoted in the frame 10, the said arms being joined by a crossbar 22$^a$, around which the upper edge of the cover section 19 is bent, to suspend said section. Links 24 connect the cover sections 18, 19 with each other, so that the several arms and the cover sections carried thereby will move in unison. The lower edge of the front cover section 18 is connected with crank arms 26 rockably mounted at one end, as at 27, in the frame 10, said crank arms being joined by a crossbar 26$^a$, and the lower edge of the cover section 18 being bent around said crossbar. The lower edge of the rear cover section 19 is secured to a crossbar 28$^a$ uniting the arms 28, the out turned ends 28$^b$ of which are pivoted in the frame 10.

With the described arrangement, upon the rear cover section 19 being raised, both cover sections will rise, the several arms swinging on their centers 21, 23, 27. As the cover sections rise, the section 18 will be given an outwardly swinging movement with its lower edge as a center, by reason of the restraining influence of the crank arms 26, the result being that the cover sections and their supporting elements will assume the positions indicated in Fig. 1.

The cover sections near the upper ends are flared outwardly, as at 25, so that said sections form a hopper mouth for the entrance of material in the loading of the cart, as clearly shown in Figs. 1 and 3. In the closed position of the cover sections, said sections engage elements on the pan and prevent the latter from turning on its axis, for which purpose, in the present example, the upper edge of the curved front 15 of the pan has an out-turned flange 29, which, when the cover section 18 is closed, will be engaged by the lower edge of said section, as shown in Fig. 1. Similarly, the upper edge of the back 15$^a$ of the pan is formed with a flange 30, to engage against the lower edge of the cover section 19 below the crossbar 28$^a$, when the said cover section is closed; thus the flange 29 by engagement with the lower edge of cover section 17 prevents a rearward turning of the pan, while the flange 30 engaging the cover section 19 prevents a forward turning of the pan until the cover sections are moved out of engagement with the pan. The flared ends 25 of the cover sections may be braced by braces 25$^a$. The front of the pan is made to slightly overbalance the rear so that the pan will have a tendency to tilt forwardly, the overbalancing being effected by a slight preponderance of the material, or by a slight eccentricity of the axis relatively to the round ends 17. On or near the lower edge of the front 15 a horizontally ranging lip or cutter edge 34 is provided, which projects beyond the lateral surface of the front 15 and ends 17, and sufficiently beyond the lateral surface of the wheels 11 for the said lip to dig into and engage the ground, when the cover sections are raised and the pan drops at the front. Thus, with the lip 34 engaging the ground, the continued forward movement of the cart will cause the pan to revolve on its axis, as will be apparent from Fig. 1, and dump the load.

The cover sections close by gravity, the tendency of the elements being such as to retain a preponderance of weight sufficiently rearward for the covers and their arms to drop into the closed position when not positively restrained against closing. A foot 33 is provided on the rear section 19 for the driver to positively lower the covers if necessary, by pulling down on said foot. To latch the covers in closed position in engagement with the pan, a latch device is provided, which comprises a vertically swinging lever 31, which is adapted to engage and overlie the foot 33, the raised position of the lever being indicated in Fig. 1 by dotted lines. A fixed hook 31$^a$ (Figs. 2 and 6) is provided, under which the free end of lever 31 may be engaged and held when the lever is lowered onto the foot 33. Lifting up on the foot 33 will raise the covers and to give a positive forward turn of the pan by the raising of the cover section a hook 32 is pivoted on the cover section 19 the lower hooked end 32$^a$ being adapted to engage under the flange 30 of the pan. Thus, when the section 19 is raised the initial movement will, through the action of hook 32, rock the pan forwardly.

Referring particularly to Fig. 3, the revolving pan is arranged so as to constitute, in one position, a leveler for leveling the dumped material. The means for locking the pan in position to act as a leveler may consist, as in this instance, of flange 30, on the pan, and the outwardly flaring hopper member 25 of the cover section 18, said outwardly flaring member being adapted to arrest the turning of the pan, by the contact of the flange 30 therewith as illustrated in said Fig. 3.

I have shown the wheels of a diameter to present a lateral surface slightly within the lateral surface of the pan, as regards the front and back 15, 15$^a$, and the ends 17, and this results not only in the engagement of the element 34 with the ground, but also of the lateral surfaces presented by the front and back, so that in the dumping movement of the pan, as well as in the leveling movement indicated in Fig. 5, the main contact with the ground will be by the pan and not the wheels. The elements 34, 29, 30, afford contact at sufficient intervals to cause the turning of the pan, particularly since the dumped material will in any event be engaged. When the mouth of the pan is inverted, for dumping, the flanges 17$^a$ constitute the tread or bearing surface. By placing the tongue in the rear socket the pan will be dumped by a backing movement.

The described construction affords a practical means for carrying my invention into effect, and I would state in conclusion, that I do not limit myself strictly to the mechanical details herein illustrated, since manifestly the same can be considerably varied without departure from the spirit of the invention.

Having thus described my invention, I claim as new, and desire to secure by Letters Patent:

1. In a dump cart, a wheeled supporting frame, a pan revolubly supported in said wheeled frame, and a cover supported on the frame independently of the pan and movable relatively to the pan and to the frame.

2. In a dump cart, a wheeled supporting frame, a pan revolubly supported in said wheeled frame, and a cover supported on the frame independently of the pan and movable relatively to the pan, the cover in the closed position engaging the pan and holding it against turning.

3. In a dump cart, a revoluble pan, a cover supported independently of the pan to move against the pan or away from the latter, said cover having a hopper mouth for the loading of the pan.

4. In a dump cart, a revoluble pan, a cover mounted independently of the pan, and means for movably mounting the cover to close or open the same, the cover and pan having engaging members when the cover is closed, the engaging members preventing the pan from turning.

5. In a dump cart, a pan mounted to turn, a lift cover formed of front and back sections mounted independently of the pan, and means for swinging the lower end of one cover section outwardly as the cover is raised.

6. In a dump cart, a pan mounted to turn, cover sections, and means for moving the cover sections toward and from the pan, said cover sections being spaced apart at their upper edges and constituting a hopper mouth when in the closed position.

7. In a dump cart, a wheeled frame, a pan mounted to turn in the frame, the pan comprising ends, a front and back extending between the ends and terminating at about the horizontal center, and a bottom, a cover having front and back members forming in the closed position of the cover continuations of the front and back of the pan, said cover members being spaced apart to provide an entrance for material to the pan, and means for supporting the cover on the frame to be raised and lowered relatively to the pan.

8. In a dump cart, a wheeled frame, a pan mounted to turn in the frame, the pan having means projecting laterally therefrom, and a cover mounted on the frame to move relatively to the pan, for closing and opening the same, said cover having means to engage the lateral means on the pan, for locking the pan in a position to constitute a leveler.

9. In a dump cart, a wheeled frame, a pan revolubly mounted in the frame, cover sections, and means on the pan with which the cover sections engage in the normal position of the pan, or in a position turned through an arc from the normal position, the pan when turned from the normal position and held by the cover sections, constituting a leveler.

10. In a dump cart, a wheeled frame, a pan revolubly mounted in the frame and presenting front and rear sides terminating at about the horizontal center of the pan, cover sections, and means supporting the cover sections from the frame and permitting the raising and lowering of the said sections, the said cover sections at their lower edges and the upper portions of the front and back of the pan having co-acting elements engaging each other in the closed position of the cover sections, to prevent the turning of the pan.

11. In a dump cart, a revoluble pan, a cover mounted independently of the pan to be moved into closed position on the pan or to a position away from the pan, said pan having a member which is below the cover when the pan is in the normal position and movable in a circular path when the pan is turned, and the cover when closed having a portion projecting into said circular path and serving to engage said member on the pan and hold the pan from turning from the normal position.

12. In a dump cart, a wheeled frame, a revoluble pan, and a pan cover mounted on the frame independently of the pan, the cover having a member engaging the pan in the closed position of the cover, and the cover having a member to engage the pan, to turn the pan by the raising of the cover.

13. In a dump cart, a wheeled frame, a pan revolubly mounted in the frame, cover sections supported independently of, and above the pan at the front and back thereof, and arms pivotally mounted on the frame at one side of the axis of the wheels, the outer ends of the arms having connection with the cover sections.

14. In a dump cart, a wheeled frame, a pan revolubly mounted in the frame, cover sections above the pan at the front and back thereof and spaced apart at their upper ends to form an inlet to the pan, arms pivotally mounted on the frame and connected respectively with the cover sections at the upper ends of the latter, and additional arms mounted on the frame and connected with the lower ends of the cover sections.

15. In a dump cart, a wheeled frame, a pan revolubly mounted in the frame, cover sections above the pan at the front and back thereof and spaced apart at their upper ends, U-shaped elements pivoted at their lower ends on the frame and connected respectively at their upper ends with the upper ends of the respective cover sections, links connecting said cover sections, a U-shaped element pivotally mounted on the frame and connected with the lower end of one cover section, and crank arms mounted on the frame and connected with the lower end of the other cover section.

16. In a dump cart, a wheeled frame, a pan revolubly mounted in the frame, said pan having front and back members rising approximately to the horizontal center of the cart; a bottom depressed within the lateral surface of the front and back, and ends rising from the bottom and extending above the front and back, the front presenting at its lower edge a laterally projecting lip and at its upper edge a laterally projecting flange, and the back of the pan presenting at its upper edge a laterally projecting member; cover sections above the pan at the front and back thereof, and means supporting the cover sections on the frame, said means connecting with the upper ends of the cover sections, one of the said cover sections having a member lying, when the sections are closed, in the circular path of movement of the laterally projecting members on the pan, to arrest the turning movement of the pan.

17. In a dump cart, a revoluble pan, and cover sections supported for movement toward or from the pan, the said cover sections being flared outwardly in opposite directions at their upper ends, forming sides of a hopper mouth.

In testimony whereof I have signed my name to this specification in the presence of two subscribing witnesses.

ELISHA G. LEDYARD.

Witnesses:
W. L. BAKER,
T. W. SEXTON.

Copies of this patent may be obtained for five cents each, by addressing the "Commissioner of Patents, Washington, D. C."